US007719733B2

(12) United States Patent
Schilling et al.

(10) Patent No.: US 7,719,733 B2
(45) Date of Patent: May 18, 2010

(54) DIFFRACTIVE SECURITY ELEMENT COMPRISING A HALF-TONE PICTURE

(75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 1050 days.

(21) Appl. No.: 10/578,108

(22) PCT Filed: Nov. 2, 2004

(86) PCT No.: PCT/EP2004/012378

§ 371 (c)(1),
(2), (4) Date: May 2, 2006

(87) PCT Pub. No.: WO2005/042268

PCT Pub. Date: May 12, 2005

(65) Prior Publication Data

US 2007/0183045 A1 Aug. 9, 2007

(30) Foreign Application Priority Data

Nov. 3, 2003 (DE) ................................ 103 51 129

(51) Int. Cl.
*G03H 1/00* (2006.01)

(52) U.S. Cl. ........................................................ 359/2

(58) Field of Classification Search ..................... 359/2, 359/567; 283/86
See application file for complete search history.

(56) References Cited

U.S. PATENT DOCUMENTS

| | | | |
|---|---|---|---|
| 4,856,857 | A | 8/1989 | Takeuchi et al. |
| 5,032,003 | A | 7/1991 | Antes |
| 6,198,545 | B1 | 3/2001 | Ostromoukhov et al. |
| 6,359,734 | B1 | 3/2002 | Staub et al. |
| 6,417,968 | B1 | 7/2002 | Staub et al. |
| 6,801,346 | B2 | 10/2004 | Schilling et al. |
| 2003/0128862 | A1 | 7/2003 | Decker et al. |

FOREIGN PATENT DOCUMENTS

| | | | |
|---|---|---|---|
| CH | 653 782 | A5 | 1/1986 |
| DE | 1 957 475 | | 6/1970 |
| DE | 44 46 368 | A1 | 6/1996 |
| EP | 0 105 099 | A | 4/1984 |
| EP | 0 264 754 | A2 | 4/1988 |

(Continued)

*Primary Examiner*—Alessandro Amari
(74) *Attorney, Agent, or Firm*—Hoffmann & Baron, LLP

(57) ABSTRACT

A diffractive security element has a half-tone image comprising diffractive structures in a reflection layer, which are embedded in a layer composite between a transparent embossing layer and a protective lacquer layer. The half-tone image is divided into image elements of at least one dimension less than 1 mm, wherein the surface of each image element is divided up into a background field and an image element pattern. The proportion of the image element pattern to the surface of the image element determines the surface brightness of the half-tone image at the location of the image element. The background field has a first diffractive structure from which the image element pattern differs by its light-modifying effect. Pattern strips of a width of up to 0.3 mm additionally extend over the surface of the half-tone image. The pattern strips occupy a small proportion of the surface of the background fields and/or the image element patterns and produce coloured strips on the half-tone image.

54 Claims, 3 Drawing Sheets

FOREIGN PATENT DOCUMENTS

| | | | |
|---|---|---|---|
| EP | 0 330 738 | | 9/1989 |
| EP | 0 375 833 | A1 | 7/1990 |
| EP | 0 779 863 | B1 | 6/1997 |
| EP | 1 023 499 | B1 | 8/2000 |
| RU | 2193232 | | 11/2002 |
| WO | WO 95/27365 | | 10/1995 |
| WO | WO 02/100654 | | 12/2002 |
| WO | WO 03/055691 | A1 | 7/2003 |

DIFFRACTIVE SECURITY ELEMENT COMPRISING A HALF-TONE PICTURE

CROSS-REFERENCE TO RELATED APPLICATIONS

This application is a National Phase application of International Application No. PCT/EP2004/012378 filed Nov. 2, 2004, which claims priority based on German Patent Application No. 103 51 129.6, filed Nov. 3, 2003, which are both incorporated herein by reference.

BACKGROUND OF THE INVENTION

The invention relates to a diffractive security element with a half-tone image as set forth in the classifying portion of claim 1.

Such security elements are used for the authentication of documents, banknotes, passes and identity cards, valuable articles of all kinds and so forth as, although they are easy to verify, they are difficult to imitate. The security element is generally fixed by adhesive on the article to be authenticated.

It is known from EP-A 0 105 099 for a security pattern of a graphic configuration to be composed mosaic-like from diffractive image elements. The security pattern changes its appearance when the person viewing it tilts the security pattern and/or rotates the security pattern in its plane.

EP-A 0 330 738 describes security patterns which have diffractive surface portions which are smaller than 0.3 mm arranged individually or in a row in the structure of the security pattern. In particular the surface portions form text characters of a height of less than 0.3 mm. The shape of the surface portions or letters can be recognised only by means of a good magnifying glass.

It is also known from EP-A 0 375 833 for a plurality of diffractive security patterns which are composed of pixels to be disposed in a security element, wherein each of the security patterns is visible by the naked eye in a predetermined orientation at the normal reading distance. Each security pattern is divided into pixels of the raster field which is predetermined by the security element. The raster field of the security element is subdivided into diffractive surface proportions, corresponding to the number of security patterns. In each raster field the pixels of the security patterns, which are associated with the raster field, occupy their predetermined surface proportion.

German laid-open application No 1 957 475 and CH 653 782 discloses a further family of microscopically fine relief structures which have an optical-diffraction effect, using the name kinoform. The relief structure of the kinoform deflects light into a predetermined solid angle. It is only when the kinoform is illuminated with substantially coherent light that the information stored in the kinoform can be rendered visible on a display screen. The kinoform scatters white light or daylight into the solid angle which is predetermined by the kinoform, but outside that angle the kinoform surface appears dark grey.

The diffractive security pattern is enclosed in a layer composite of plastic materials, which is designed to be applied to an article. U.S. Pat. No. 4,856,857 describes various configurations of the layer composite and the appropriate materials are listed therein.

On the other hand it is known from U.S. Pat. No. 6,198,545 to form half-tone images, produced by a printing procedure, comprising pixels, with image elements or characters, wherein the black component in the otherwise white pixel background is so selected that the viewing person sees the half-tone image at the viewing distance of 30 cm to 1 m and can recognise the image elements or characters only when viewing more meticulously, at a very close distance or with a magnifying glass. That image synthesis technology is known by the term ‘artistic screening’. Good copies of half-tone images without artistic screening are easy to produce as a result of the continuously improved resolution in copying technology.

SUMMARY OF THE INVENTION

The object of the present invention is to provide a diffractive security element which shows a half-tone image and which is difficult to imitate or copy.

According to the invention the specified object is attained by the features recited in the characterising portion of claim 1. Advantageous configurations of the invention are set forth in the appendant claims.

The idea of the invention is to produce a diffractive security element which has at least two different recognisable patterns, wherein the one pattern is a half-tone image which is visually recognisable at a viewing distance of 30 cm to 1 m and which is composed of a plurality of image element patterns. The image element patterns are arranged on a background and cover locally, for example in a pixel, a proportion of the background which is predetermined by the local surface brightness in the half-tone image. Both the background surfaces and also the surfaces of the image element patterns are optically active elements such as holograms, diffraction gratings, matt structures, reflecting surfaces and so forth, wherein the optically active elements for the surfaces of the image element patterns and for the background differ in terms of diffraction or reflection characteristics. The image element patterns in the half-tone image are recognisable only upon being viewed at a reading distance of less than 30 cm with or without aids, for example a magnifying glass. In another embodiment of the security element, pattern strips which are up to 25 μm wide extend over the surface of the half-tone image as further patterns. The straight and/or curved pattern strips form a background pattern, such as for example guilloche patterns, pictograms and so forth. Line elements are arranged on the background, in the surfaces of the pattern strips. The surface proportion of the line elements per unit of length of the pattern strip is determined by the local surface brightness in the image element pattern, through which the pattern strip extends. The surfaces of the line elements differ by virtue of their optically active elements from the surfaces of the background and/or the image element patterns. The image element patterns and line patterns are composed of characters, lines, weave and frieze patterns, letters and so forth. The security element can be combined with the diffractive security patterns referred to in the opening part of this specification, from EP-A 0 105 099 and EP-A 0 330 738.

BRIEF DESCRIPTION OF THE DRAWINGS

Embodiments of the invention are described in greater detail hereinafter and illustrated in the drawing in which.

DETAILED DESCRIPTION OF THE INVENTION

Figure 1:
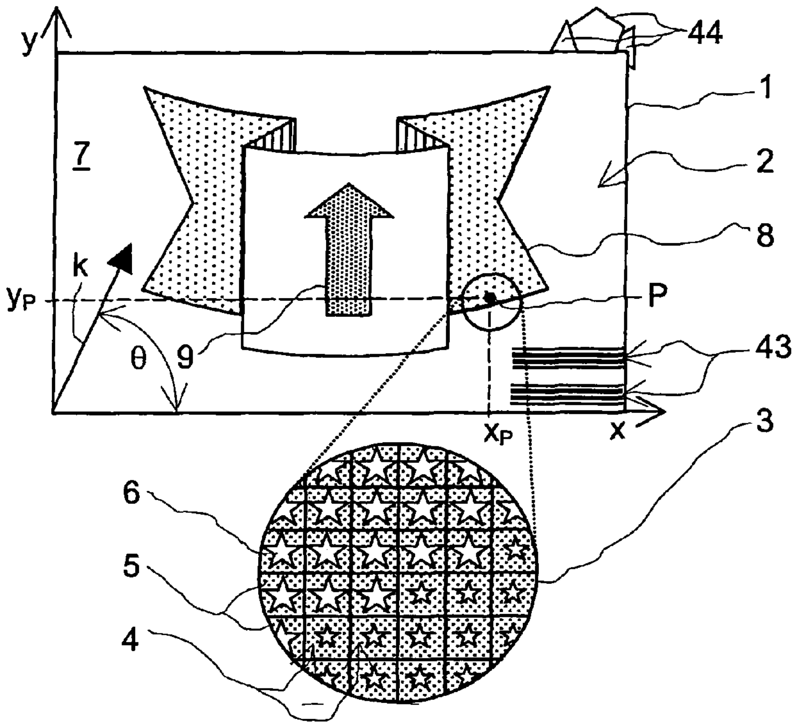
FIG. 1 shows a security element with an enlarged portion.

In FIG. 1 reference 1 denotes a diffractive security element, reference 2 denotes a half-tone image of pattern elements, reference 3 denotes a greatly enlarged portion from the security element 1, reference 4 denotes image elements, reference 5 denotes background areas or fields and reference 6 denotes image element patterns. The pattern elements of the half-tone image 2 are the pixel-like image elements 4 which are made up in a mosaic configuration from surface portions. Microscopically fine surface structures in the surface portions of the image elements 4 modify light incident on the security element 1, in dependence on the illumination and viewing direction. The surface portions with the light-modifying surface structures include at least the background fields 5 and the image element patterns 6. The surface structures can be provided with a reflection layer to enhance the light-modifying action.

In the view in FIG. 1, for the greater ease of description, the surface of the security element 1 is oriented with respect to a co-ordinate system having the co-ordinate axes x and y. In addition, for reasons relating to clarity the surfaces of the background fields 5 and the image element patterns 6 respectively are shown in the drawing rastered or unrastered in white, wherein the background fields 5 and the image element patterns 6, unlike the situation with half-tone images produced by printing technology, without their illumination and viewing directions being specified, do not allow any indications in respect of their surface brightness.

As is shown in the enlarged portion 3 in FIG. 1, in an embodiment the surface of the security element 1 is divided into a plurality of the image elements 4 which are smaller than 1 mm at least in one dimension, for example the image elements 4 are in the shape of a square, a rectangle, or a polygon, or are a conformal representation of one of those surfaces. Boundaries between the image elements 4 are shown in the drawings only for reasons of clarity thereof. The surface of each image element 4 has at least the background field 5 and the image element pattern 6 arranged on the background field 5, wherein the image element pattern 6 is a continuous surface portion or also comprises a group of surface portions.

The surface brightness of the half-tone image 2 at the location P corresponding to the image element 4 having the co-ordinates ($x_P$; $y_P$) determines, preferably having regard to the surface brightness of the locations in the half-tone image 2 which correspond to the adjacent image elements 4, and/or the gradient of the surface brightness at the location P, the surface proportion of the image element pattern 6 in the surface of the image element 6 having the co-ordinates ($x_P$; $y_P$).

For example the surface proportion of the image element pattern 6 in the image element 4 with the co-ordinates ($x_P$; $y_P$), is correspondingly larger, the greater the surface brightness at the location P of an image original of the half-tone image 2. So that a half-tone image 2 is produced all image element patterns 6 must have the same light-modifying action in a predetermined illumination and observation direction, while the background fields 5 deflect as little light as possible into that observation direction.

The surface proportion of the image element pattern 6 in the image element 4 can be in the range between 0% and 100% if the shape of the image element pattern 6 is similar to the shape of image element 4. The term 'similar shape' is used to mean shapes which are identical in the corresponding angles but are of different dimensions. If the boundary shape of the image element pattern 6 which for example is in the shape of a star differs from the shape of the image element 4, the range of the surface proportions of the image element patterns 6 in the image elements 4 is restricted at the upper end, that is to say, there is still a proportion of the background field 5 present in the image element 4. Preferably however it is possible to recognise the image element pattern 6 in each image element even if of different sizes or in a narrow strip, corresponding to the surface proportion, in the boundary shape of the image element pattern 6, in order to obtain in the image element 4 the necessary surface proportion of the image element pattern 6. Representation of the half-tone image 2 is based on a scale with predetermined steps in respect of the surface proportions of the image element pattern 6 in the image element 4, in which respect the surface brightnesses of the image original are converted by means of that scale into the half-tone image 2.

By way of example the image original of the half-tone image 2 has on a base surface 7 a folded strip 8 and an arrow 9 which is arranged at the centre of the strip 8. The surface of the half-tone image 2 is divided into the image elements 4. The surface brightnesses of the image original are associated with the image elements 4 in accordance with the pattern elements, for example the base surface 7, the strip 8, the arrow 9 and so forth. In the view shown in FIG. 1 the base surface 7, the arrow 9 and the visible surfaces of the strip 8, which are shown in different rasters, differ as in the image original by virtue of their surface brightnesses. The viewer recognises on the security element 1 at least the half-tone image 2 of the image original, in different surface brightness gradations. Because of the relatively large image elements 4 the security element 1 is to be viewed from a minimum viewing distance of about 0.3 m or more in order to well recognise the half-tone image 2. From a reading distance of less than 30 cm the predetermined image element patterns 6 can still be recognised by the viewer with the naked eye or with a simple magnifying glass. For example the image element pattern 6 is a star in the view shown in FIG. 1. In other configurations of the security element 1 the adjacent image element patterns 6 differ. From the reading distance <30 cm the coarse raster of the image element patterns 6 interferes with recognition of the half-tone image 2.

In an embodiment of the half-tone image 2 the image element patterns 6 are similar in all image elements 4. In the example illustrated in FIG. 1 in the portion 3 the star-shaped image element patterns 6 in the image elements 4 are shown small, in parts involving a low level of surface brightness, here for the base surface 7. The surface proportions of the image element patterns 6 are correspondingly greater in the image elements 4 if for example the parts of the strip 8 with the graded higher levels of surface brightness which differ from the base surface 7 are to be represented. Both the surfaces of the background fields 5 and the image element patterns 6 have for example general diffractive surface structures with a reflection layer. The background fields 5 differ from the image element patterns 6 in at least one structural parameter of the surface structure such as for example azimuth, spatial frequency, profile shape, profile depth, groove curvature and so forth, or insofar as the surfaces of the background fields 5 or the image element patterns 6 are transparent, for example as a consequence of local removal of the reflection layer, or are covered by means of a colour layer (for example white or black). The surfaces of the background fields 5 thus differ from the surfaces of the image element patterns 6 by the light-modifying action of their surface structures. In an embodiment of the half-tone image the surface structures have additional structural parameters which are dependent on the co-ordinates (x; y), in the surfaces of the background fields 5 and/or the image element patterns 6.

Besides that simple example of the half-tone image 2, in particular representations (for example portraits) of known personalities are suitable for the half-tone images 2, in which respect the image element patterns 6 advantageously have a reference to the illustrated personality, for example letters of a continuous text written by the personality and/or a composed melody in musical notation.

Figure 2:
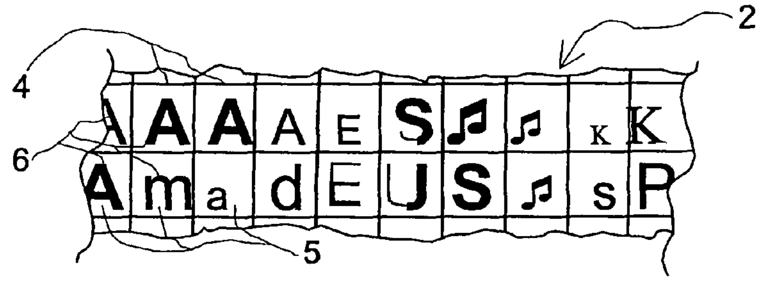
FIG. 2 shows letters as image element patterns in image elements.

In FIG. 2 the image elements 4 each include a respective image element pattern 6 in the form of an individual letter against the background of the background field 5. The image elements 4 are arranged in a row with each other in such a way that the letters in the image element patterns 6 involve the sequence corresponding to the text. The surface proportions, which are predetermined by the half-tone image 2, of the letters in the field of the image element 4 are achieved by altering the thickness and/or the size of the letters. The thickness changes continuously or in steps within a letter if that affords better resolution for the half-tone image 2. In the drawing shown in FIG. 2 that is illustrated in the case of the letters S and E, U. The dimensions of the image elements 4 with letters are kept correspondingly small so that the letters can be read when viewed from close, that is to say at the normal reading distance, but they can no longer be read from the above-mentioned viewing distance. In another embodiment the image elements 4 are microscopically small, in which case the letters or the notation can be recognised only through a microscope. A text which can only be recognised at a magnification of at least 20 times is referred to hereinafter as 'nanotext'. The view in FIG. 2 is a simplification and does not show the dimensioning of the image elements 4, which is adapted to the letters, for example in the case of letters of a proportional script or the nanotext in the image element 4 involving an elongate rectangular shape with continuous, for example manuscript texts.

Figure 3:
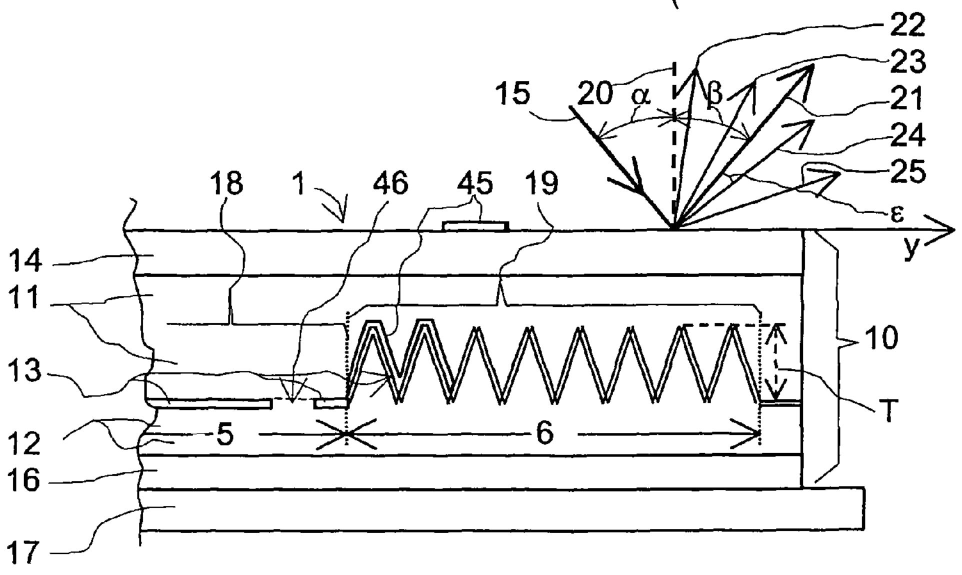
FIG. 3 shows a cross-section through the security element.

FIG. 3 shows a typical cross-section through the security element 1. The security element 1 is a portion of a layer composite 10, which includes the half-tone image 2 (FIG. 1). The composite 10 includes at least an embossing layer 11 and a protective lacquer layer 12. The two layers 11 and 12 comprise plastic material and enclose a reflection layer 13 between them. In another embodiment a scratch-resistant, tough and transparent protective layer 14 of polycarbonate, polyethylene terephthalate and so forth covers over the complete surface of the side of the embossing layer 11, which is remote from the reflection layer 13. At least the embossing layer 11 and the protective lacquer layer 14 which is possibly present are at least partially transparent for incident light 15. The protective lacquer layer 12 itself or an optional adhesive layer 16 arranged on the side of the protective lacquer layer 12 that is remote from the reflection layer 13 is adapted for joining the security element 1 to a substrate 17. The substrate 17 is a valuable article, a document, a banknote and the like to be authenticated with the security element 1. Further configurations of the layer composite 10 are described for example in above-mentioned U.S. Pat. No. 4,856,857. That document summarises the materials which are suitable for construction of the layer composite 10 and the materials suitable for the reflection layer 13. The reflection layer 13 is in the form of a thin layer of a metal from the group aluminium, silver, gold, chromium, copper, nickel, tellurium and so forth and is formed by a thin layer comprising an inorganic dielectric such as for example $MgF_2$, ZnS, ZnSe, $TiO_2$, $SiO_2$ and so forth. The reflection layer 13 can also include a plurality of layer portions of different inorganic dielectrics or a combination of metallic and dielectric layers. The layer thickness of the reflection layer 13 and the choice of the material of the reflection layer 13 depend on whether the security element 1 is purely reflective, as mentioned hereinbefore transparent only in surface portions, that is to say partly transparent, or transparent with a predetermined degree of transparency. In particular reflection layers 13 of tellurium are suitable for individualisation of the individual security element 1 as the reflecting tellurium layer becomes transparent under the effect of a fine laser beam through the plastic layers of the layer composite 10 at the location of irradiation and a window 46 is produced without the layer composite 10 being damaged. The transparent windows 46 formed in that way form for example an individual code. In the same way the reflection layer 13 is removed in the surfaces of the background fields 5 or the image element patterns 6 respectively if an individual half-tone image 2 is to be produced.

The reflection layer 13 in the region of the half-tone image 2 has the microscopically fine surface structures diffracting the incident light 15. The surfaces of the background fields 5 are occupied by a first structure 18 and a second structure 19 is shaped into the surfaces of the image element patterns 6. Those structures 18, 19 are afforded by using the diffractive surface structures which are selected from a group formed from diffraction gratings, holograms, matt structures, kinoforms, motheye structures and reflecting surfaces. The reflecting surfaces include flat, achromatically reflecting mirror surfaces and diffraction gratings acting like a coloured mirror. Those colour-reflecting diffraction gratings are in the form of a linear grating or a cross grating and involve spatial frequencies f of more than 2300 lines/mm and depending on their optically active structural depth T selectively reflect colour components of the incident light in accordance with the laws of reflection. If the optically active structural depth T is below a value of about 50 nm the incident light is practically achromatically reflected. The flat mirror surface which is parallel to the surface of the layer composite 10 is also to be associated as a singular relief structure with that group of the microscopically fine surface structures, in which respect the flat, achromatically reflecting mirror surface is characterised by the spatial frequency $f=\infty$ or 0 and the structural depth $T=0$. The kinoforms are described in above-mentioned German laid-open application No 1 957 475 and CH 653 782.

By way of example one of the above-mentioned surface structures extends as a background field 5 over the entire surface provided for the half-tone image 2. The surfaces of the image element patterns 6 are subsequently covered with the predetermined colour. Colour application as indicated at 45 is effected on the surfaces of the image element patterns 6 by means of ink jet printing or intaglio printing, for example on the free surface of the layer composite 10. The simplest configuration of the security element 1 already affords the advantage that a copy of the security element 1, which is produced with a copier apparatus, differs clearly from the original. In another configuration the colour application 45 in the surfaces of the background fields 5 and the image element patterns 6 respectively is disposed directly between the embossing layer 11 and the reflection layer 13. In contrast to the view shown in FIG. 3 the colour application 45 extends over the entire surface of the background field 5 or the image element pattern 6 respectively. Equally the windows 46 produced by the above-mentioned operation of removing the reflection layer 13 have the entire surface of the background field 5 and the image element pattern 6 respectively.

By way of example the reflection layer 13 in the background fields 5, as the first structure 18, has a reflecting surface which is either in the form of a flat mirror surface or in the form of a diffraction grating acting like a coloured mirror. Upon illumination with daylight or with polychromatic artificial light the incident light 15 impinges on the layer composite 10 at an angle of incidence α, wherein the angle of incidence α is measured between the direction of the incident light 15 and a normal 20 to the surface of the layer composite 10. Light 21 reflected at the first structure 18 leaves the layer composite 10 at an angle of reflection β which is measured relative to the normal 20 and which is equal to the angle of incidence α in accordance with the laws of reflection. It is only when the viewer looks at a close solid angle directly into the reflected light 21 that the background fields 5 together give a light impression, in which case the flat mirrors reflect the daylight unchanged (that is to say achromatically), while the diffraction gratings with a spatial frequency f of more than 2300 lines/mm reflect a mixed colour which is typical of them. In the other directions of the half-space above the layer composite 10 the background fields 5 are practically black.

Therefore in particular also a relief which absorbs the incident light 15 and which is known by the term 'motheye structure' and whose regularly arranged, pin-shaped relief structure elements project by around 200 nm to 500 nm above a base surface of the relief is suitable for the first structure 18. The relief structure elements are spaced 400 nm or less from each other. The surfaces with such motheye structures reflect less than 2% of the light 15 incident from any direction and are black for the viewer.

Shaped in the image element patterns 6 is the second structure 19 which deflects the incident light 15 substantially outside the direction of the reflected light 21. The microscopically fine reliefs of the linear diffraction gratings with a spatial frequency f from the range of 100 lines/mm to 2300 lines/mm satisfy that condition. For achromatic diffraction gratings the spatial frequency f is selected from the range of values of f=100 lines/mm to f=250 lines/mm. Diffraction gratings which break the incident light 15 down into colours have preferred values in respect of the spatial frequency f from the range between f=500 lines/mm and f=2000 lines/mm. The orientation of the grating vector k (FIG. 1) is established with respect to the co-ordinate axis x (FIG. 1) by the azimuth θ (FIG. 1). A special case in respect of the linear diffraction gratings is formed by those whose grooves meander, but in such a way that the meandering grooves on average follow a straight line. Those diffraction gratings have a greater range in the azimuth, in respect of which they are visible to the viewer.

The incident light 15 is diffracted at the second structure 19 and deflected in the form of light waves 22, 23 into the minus first diffraction order and in the form of light waves 24, 25 into the plus first diffraction order in accordance with its wavelength from the direction of the reflected light, wherein the blue-violet light waves 23, 24 are diffracted out of the direction of the reflected light 21 by the minimum diffraction angle ±∈. The light waves 22, 25 of greater wavelengths are deflected by correspondingly greater diffraction angles.

The incident light 15 and the normal 20 define a viewing plane which in the view in FIG. 3 coincides with the plane of the drawing and is parallel to the co-ordinate axis y. The viewing direction of the observer is in the viewing plane and the eye of the observer receives the reflected light 21 of the reflecting background fields 5 when the viewing direction and the normal 20 include the angle of reflection β.

The diffraction gratings have their optimum action if their grating vector k is oriented in parallel relationship with the observation plane which in this case is identical to the diffraction plane.

In that case the diffracted light beams 21 to 24 are in the observation plane and, in accordance with the viewing direction, produce a predetermined colour impression in the eye of the observer. If the grating vector k is not in the observation plane, that is to say it is not within a viewing angle of about ±10° with respect to the observation plane, or the light beams 21 to 24 are not in the viewing direction, the observer perceives the surface of the diffraction grating or the image element pattern 6 as a dark-grey surface because of the little light which is scattered at the second structure 19. With a clever choice in respect of the structural parameters in relation to the content of the half-tone image 2 therefore one of the diffraction gratings can also be used as first structures 18 of the background fields 5. On the other hand a superimposition of the diffraction grating with one of the matt structures described hereinafter causes an increase in the viewing angle of the image element pattern 6.

In the view shown in FIG. 3 the profile of the second structure 19 is illustrated by way of example with a symmetrical sawtooth profile of a periodic grating. In particular also one of the other known profiles is suitable for the structures 18, 19, such as for example asymmetrical sawtooth profiles, rectangular profiles, sinusoidal and sine-like profiles and so forth, which form a periodic grating with straight grooves, meandering grooves or grooves which are circular or curved in another fashion. As the material of the embossing layer 11 with a refractive index n of around 1.5 fills the structures 18, 19, the optically active structural depth T is n-times the shaped geometrical structural depth. The optically active structural depth T of the periodic gratings used for the structures 18, 19 is in the range of 80 nm to 10 μm, wherein for technical reasons the relief structure with a large structural depth T involves a low value in respect of the spatial frequency f.

If the second structure 19 of the image element patterns 6 must deflect the incident light 15 into a large solid angle region of the half-space above the layer composite 10, a matt structure, for example a kinoform, an isotropic or an anisotropic matt structure and so forth are advantageously suitable. The image element patterns 6 are visible from all viewing directions within the solid angle determined by the matt structure, as a light surface. The relief structure elements of those microscopically fine reliefs are not arranged regularly as in the diffraction grating. The description of the matt structure is implemented with statistical parameters such as for example mean roughness value $R_a$, correlation length $I_c$ and so forth. The microscopically fine relief structure elements of the matt structures which are suitable for the security element 1 have values in respect of the mean roughness value $R_a$, which are in the range of 20 nm to 2500 nm. Preferred values are between 50 nm and 1000 nm. At least in one direction the correlation length $I_c$ is of values in the range of 200 nm to 50,000 nm, preferably between 1000 nm and 10,000 nm. The matt structure is isotropic if microscopically fine relief structure elements do not have any azimuthal preferential direction, for which reason the scattered light, with an intensity which is greater than a limit value predetermined for example by visual recognisability, is distributed uniformly in a solid angle predetermined by the scatter capability of the matt structure, in all azimuthal directions. The solid angle is a cone whose tip is on the part of the layer composite 10 which is illuminated by the incident light 15, and the axis of which coincides with the direction of the reflected light 21. Strongly scattering matt structures distribute the scattered light in a larger solid angle than a weakly scattering matt structure. If in contrast the microscopically fine relief structure elements have a preferred direction at the azimuth, there is an anisotropic matt structure which anisotropically scatters the incident light 15, wherein the solid angle which is predetermined by the scatter capability of the anisotropic matt structure involves in cross-section the shape of an ellipse whose large major axis is oriented perpendicularly to the preferred direction of the relief structure elements. In contrast to the non-achromatic diffraction gratings, the matt structures scatter the incident light 15 achromatically, that is to say independently of the wavelength thereof, so that the colour of the scattered light substantially corresponds to that of the light 15 incident on the matt structures. For the observer, the surface of the matt structure, in daylight, has a high level of surface brightness and is visible practically independently of the azimuthal orientation of the matt structure, like a sheet of white paper.

Figure 4:
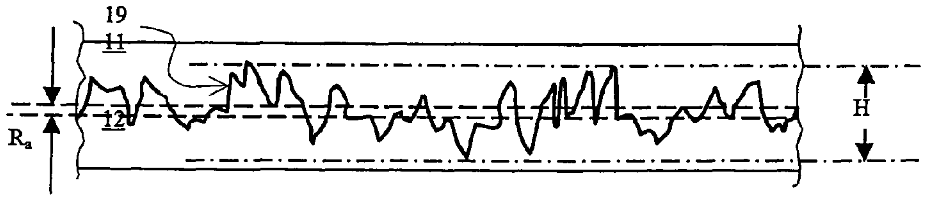
FIG. 4 shows a matt structure.

FIG. 4 shows a cross-section by way of example through one of the matt structures which is enclosed as a second structure 19 between the embossing layer 11 and the protective lacquer layer 12. In accordance with the structural depth T (FIG. 3) of the diffraction gratings the profile of the matt structure is of the mean roughness value $R_a$, but there are very great differences in height H up to about 10 times the mean roughness value $R_a$ between the microscopically fine relief structure elements of the matt structure. The height differences H in the matt structure, which are important for the shaping operation, therefore correspond to the structural depth T in respect of the periodic diffraction gratings. The values of the height differences H of the matt structures are in the above-mentioned range in respect of the structural depth T.

A special implementation of the matt structure is superimposed with a 'weakly acting diffraction grating'. Because of the small structural depth T of between 60 nm and 70 nm the weakly acting diffraction grating has a low diffraction efficiency. A spatial frequency in the range of f=800 lines/mm to 1000 lines/mm is preferred for this use.

Circular diffraction gratings involving a period of 0.5 μm to 3 μm and with spiral-shaped or circular grooves can also be used for the image element patterns 6. The diffractive structures which increase the viewing angle are summarised hereinafter by the term 'diffractive scatterer'. The term 'diffractive scatterer' is thus used to denote a structure from the group of isotropic and anisotropic matt structures, kinoforms, diffraction gratings with circular grooves at a groove spacing of 0.5 μm to 3 μm and the matt structures which are superimposed with a weakly acting diffraction grating.

Coming back to FIG. 3: in a first configuration the half-tone image 2 (FIG. 1) is static, that is to say in a wide range in respect of spatial orientation under a usual observation condition at the specified viewing distance and with illumination with white incident light 15, the half-tone image 2 does not change. It is only upon closer inspection that the observer notes that the half-tone image is divided into the image elements 4 (FIG. 1) and the image element patterns 6 have predetermined shapes. The first structure 18 in the background field 5 reflects or absorbs the incident light 15. The second structure 19 of the image element patterns 6 is one of the diffractive scatterers. The second structure 19 scatters or diffracts the incident light 15 in such a way that the image element pattern 6 is visible in a large solid angle which is predetermined by the diffractive scatterer. Upon illumination of the security element 1 with white light 15 the observer sees the half-tone image 2 arranged at the stated viewing distance in a grey scale as the observer perceives the image elements 4 with a large surface proportion of the image element pattern 6 in a high level of surface brightness and the image elements 4 with a smaller surface proportion of the image element pattern 6 at a higher level of surface brightness. The visibility of the half-tone image 2 behaves substantially like a half-tone image printed on paper in black-and-white. However the half-tone image 2 is difficult to recognise or cannot be recognised or contrast reversal of the half-tone image can also occur, if the viewing direction is outside the solid angle of the scattered or diffracted light. If the first structures 18 have a reflective property the contrast also changes over if the security element 1 is oriented precisely in such a way that the half-tone image 2 is viewed precisely in opposite relationship to the direction of the reflected light 21. The image elements 4 which are light prior to tilting of the security element 1 are now darker than the previously dark image elements 4 which are now much lighter in the reflected light 21, and vice-versa. The tilting movement of the security element 1 is effected about an axis in perpendicular relationship to the observation plane and parallel to the plane of the security element 1.

The combinations of the first and second structures 18, 19, which are summarised in Table 1, are preferred for representing the half-tone image 2.

In a second configuration the structures 18, 19 are selected in such a way that the contrast in the half-tone image 2 changes over if the security element 1 is tilted or rotated in its plane through an angle of rotation about an axis parallel to the normal 20. The contrast reversal is therefore easier to observe in comparison with the first embodiment of the security element 1. The first structure 18 in the background fields 5 is for example a linear diffraction grating whose grating vector k has the azimuth θ=0° (FIG. 1), that is to say in the direction of the co-ordinate axis x. The image element patterns 6 are occupied with one of the diffractive scatterers. The observer rotates the security element 1 about the normal 20 and views the half-tone image 2 arranged at the viewing distance of 50 cm or more, in grey scale, except if the grating vector k of the first structure 18 is oriented practically parallel to the observation plane and the viewing direction of the observer is directed in the direction of one of the light beams 21 to 25. Upon tilting of the security element 1 oriented in that way about an axis parallel to the co-ordinate axis x the half-tone image 2 in contrast reversal changes its colour in accordance with the diffracted light beam 22 to 25 which is deflected into the eye of the observer. The half-tone image 2 is again recognisable in the grey scale mode in the angle regions which are not occupied by the diffracted light beams 22 to 25 of a diffraction order.

In a third embodiment of the security element 1 both fields, the background fields 5 and the image element patterns 6, have the structures 18, 19 of the diffraction gratings which break the incident light 15 down into colours and which differ only in respect of the azimuth θ of the grating vectors k. The grating vector k is oriented parallel to the co-ordinate axis y for the diffraction gratings of the image element patterns 6, that is to say with the azimuth θ=90° and 270° respectively. The grating vector k for the diffraction gratings of the background fields 5 differs in respect of azimuth from the grating vectors k in the image element patterns 6 and for example has the azimuth θ=0° and 180° respectively. The observer with the viewing direction parallel to the diffraction plane, which includes the co-ordinate axis y and the grating vector k of the first structures 18, views the half-tone image 2 at the above-mentioned viewing distance in one of the diffraction colours in contrast with the image original, in other words he sees the lighting-up surfaces of the image element patterns 6 with the second structures 19 lighter than the scatter light of the background fields 5. During the rotation of the layer composite 10 in its plane the contrast disappears in the half-tone image 2 in order to recur at the rotational angle α of 90° and 270° respectively as the grating vectors k of the first structure 18 in the background fields 5 are oriented in parallel relationship with the observation plane and therefore the background fields 5 now light up. The half-tone image 2 is visible to the observer in a condition of inverted contrast and in the same colour. If in addition the spatial frequencies f of the first and second structures 18, 19 differ for example by 15 to 25%, upon rotation not just the contrast but also the colour in the half-tone image 2 changes. With viewing angles outside the diffracted light beams 22, 23 and 24, 25 of the diffraction orders, the half-tone image 2 is not recognisable due to the lack of contrast.

If the spatial frequencies f of the first and/or second structures 18, 19 are selected in dependence on location, the half-tone image 2 exhibits a coloured image which, at a predetermined tilt angle, corresponds for example to the colours of the image original.

In a modified second and third embodiment of FIG. 1 the first structures 18 (FIG. 3) of the background fields 5 involve different directions for the grating vectors k, that is to say they have azimuths θ in the range of $-80° \leqq \theta \leqq 80°$ so that the surfaces of those structures 18 whose grating vectors k are precisely parallel to the observation plane light up in colour during the rotation of the layer composite 10 in that azimuth range in the dark contrast-less image of the security element 1.

In another preferred implementation of FIG. 1, the linear diffraction gratings are shaped in the background fields 5 in such a way that the diffraction gratings are arranged with grating vectors k directed in parallel relationship, in rows of the image elements 4. The azimuths θ of the grating vectors k of the one row differ however from the azimuths θ of the grating vectors k of the background fields 5 in the two adjacent rows of the image elements 4. For example there are three rows A, B, C with predetermined azimuth values. No grating vectors k of the background fields 5 are oriented in parallel relationship with the co-ordinate axis y as in the case of the grating vectors k of the image element patterns 6. The observer therefore views the half-tone image 2 in the correct contrast if the co-ordinate axis y of the half-tone image 2 is in the observation plane. The image element patterns 6 are light and the background fields 5 are dark. Upon rotation about the normal 20 (FIG. 3) the security element 1 changes its appearance if the layer composite 10 (FIG. 1) is viewed under the same illumination and observation conditions as in FIG. 1. The half-tone image 2 becomes the dark contrast-less image, in which case in rows A, B and C the background surfaces 5 whose grating vectors k are precisely parallel to the observation plane light up in colour.

Figure 5:
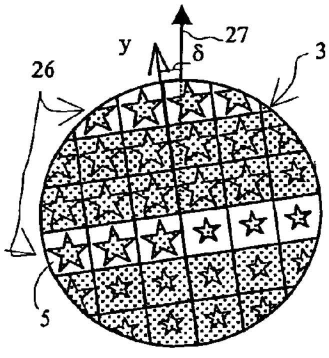
FIG. 5 shows the enlarged portion at a rotary angle δ.

FIG. 5 shows the portion 3 from FIG. 1 after rotation through the angle of rotation δ. At the specified viewing distance the half-tone image 2 (FIG. 1) appears as a dark contrast-less surface on which are arranged brightly lit strips which are formed by the A-rows 26 of the image elements 4 (FIG. 1) with the background fields 5 whose grating vectors k (FIG. 1) are oriented with the rotational angle δ in parallel relationship with the trace 27 of the observation plane on the plane of the layer composite 10.

Figure 6:
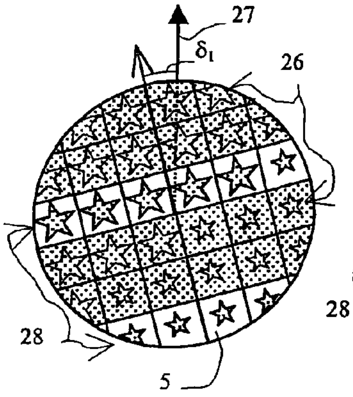
FIG. 6 shows the enlarged portion at the rotary angle $\delta_1$.
Figure 7:
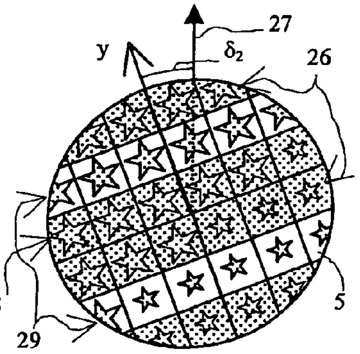
FIG. 7 shows the enlarged portion at the rotary angle $\delta_2$.

FIG. 6 shows that at the angle $\delta_1$ in contrast the background fields 5 of the B-rows 28 light up as soon as the grating vectors k (FIG. 1) of the background fields 5 in the B-rows 28 are oriented in parallel relationship with the trace 27. The background fields 5 of the A-rows 26 now form a part of the contrast-less dark surface of the security element 1 (FIG. 1) as the grating vectors k of the A-rows 26 are rotated out of the observation plane. For the same reason in FIG. 7, with the rotational angle $\delta_2$, the background fields 5 of C-rows 28 are light and those of the other rows 26, 28 are dark. In other words if the rows 26, 28, 29 in the sequence ABC, . . . ABC . . . and so forth are arranged cyclically repetitively on the security element 1 (FIG. 1), then upon rotation of the security element 1 light coloured strips which are dependent on the spatial frequency f of the first structures 18 (FIG. 3) used in the background fields 5 travel over the surface of the security element 1 (FIG. 1) until at the rotational angle δ=180° and 0° respectively the half-tone image 2 becomes visible again without coloured strips as the co-ordinate axis y and the grating vectors k (FIG. 1) of the second structures 19 (FIG. 3) in the image element patterns 6 are oriented in parallel relationship with the trace 27.

If the second structure 19 is one of the diffractive scatterers the half-tone image 2 is visible substantially independently of the rotational angle δ, wherein upon rotation of the security element 1 the coloured strips of the rows 26, 28, 29 appear to travel over the half-tone image 2.

When viewed at less than the reading distance the rows 26, 28, 29 of the image elements 4 are broken up and the background fields 5 and the image element patterns 6 (FIG. 1) respectively are recognisable under the same conditions as above.

Figure 8:
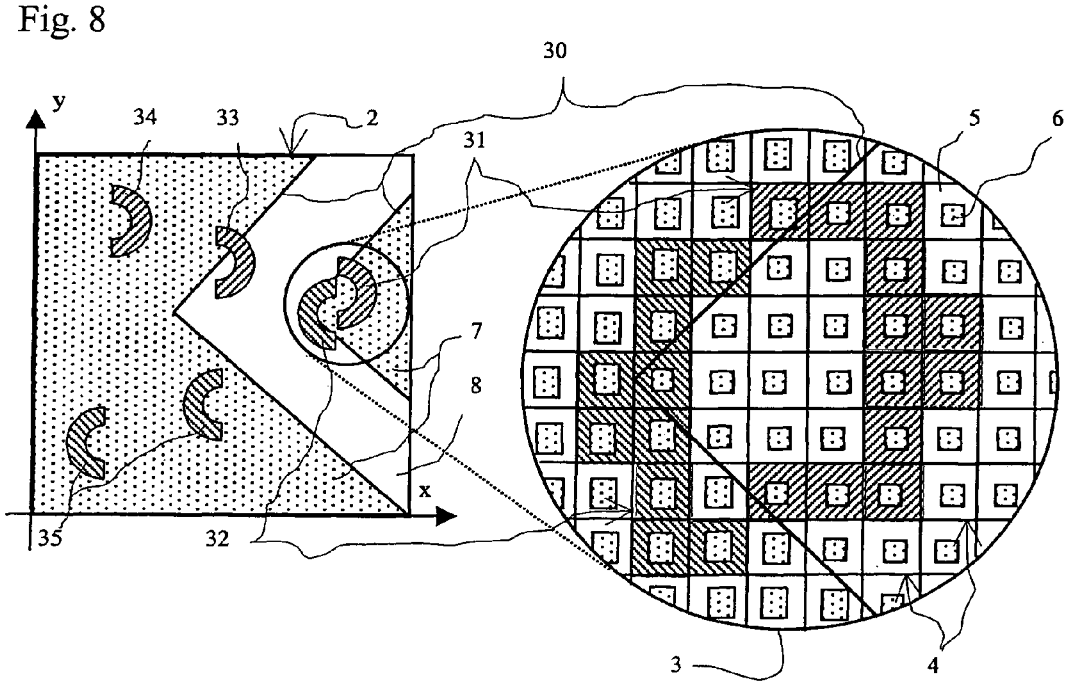
FIG. 8 shows small-size images in the security element.

In FIG. 8 the half-tone pattern 2 has a flag-like division in which a strip 8 delimited by boundary lines 30 is arranged on the base surface 7. The image elements 4 which are visible in the enlarged portion 3 comprise a larger surface proportion of the image element patterns 6 for the strip 8 than for the base surface 7. The surfaces of the image element patterns 6 are occupied by one of the diffractive scatterers and the surfaces of the background fields 5 are occupied by one of the diffraction structures. The background fields 5 whose first structures 18 (FIG. 3) are of the same spatial frequency f and the mutually parallel grating vectors k (FIG. 1), that is to say involve the same azimuth θ≠90° and 270° respectively (FIG. 1) are not arranged in simple straight strips 26 (FIG. 7), 28 (FIG. 7), 29 (FIG. 7) of the image elements 4, but in such a way that the image elements 4 with those background fields 5 form at least one small image 31 which is visible at a predetermined viewing angle. In the view shown in FIG. 8 for example the small images 31 to 35 represent circular ring segments. The small images 31 to 35 are distinguished by the values in respect of spatial frequency f and azimuth θ (FIG. 1) of the grating vectors k (FIG. 1), which values are used for the first structures 18 of the background fields 5. The background fields 5 which are not used for the small images 31 to 35 have for example a reflecting surface or a motheye structure. At the specified viewing distance the observer sees the half-tone image 2 in grey tones irrespective of the rotational angle θ (FIG. 5). On the surface of the security element 1 (FIG. 1) the observer recognises those small images 31, 32, 33, 34, 35 whose grating vectors occur randomly in the observation plane upon rotation of the security element 1, wherein the colour of the visible small images 31 to 35 is determined by the spatial frequency f and by the tilt angle of the security element 1.

For example when the security element 1 is rotated about the normal 20 (FIG. 3) one or more of the small images 31 to 35 light up in a predetermined sequence and produce a kinematic impression, that is to say upon rotation about the normal 20 (FIG. 3) the locations of the small images 31 to 35 which are just visible travel over the surface of the security element 1. Upon tilting about the co-ordinate axis x the colours of the small images 31 to 35 which are just visible change. In an embodiment a plurality of those small images 31 to 35 are so arranged that some of them, denoted here by references 31 and 32, at an orientation of the security element 1 which is determined by the rotational angle δ and the tilt angle, form a predetermined character, that is to say the small images 31 to 35 advantageously serve to establish a predetermined orientation of the security element 1 in space.

The small images 31 to 35 are not just limited to simple characters but in an embodiment are images based on pixels such as for example a greatly reduced copy of the half-tone image 2 or a graphic representation comprising line and/or surface elements.

In a further embodiment of the half-tone image 2 the background fields 5 for example of the small image 31 have the reflecting cross grating involving the spatial frequency f≧2300 lines/mm as the first structure 18. The small image 31 is visible for the observer only when he looks directly into the reflected light 21 (FIG. 3) and recognises the small image 31 in the mixed colour which is characteristic of those high-frequency diffraction gratings or when, in consideration of the large diffraction angles ∈ (FIG. 3), he views the small image 31 at the corresponding tilt angle and recognises the small image 31 in a light, blue-green colour against the dark field of the security element 1.

In another embodiment the background fields 5 have a diffraction grating with the azimuth θ=0° which breaks down the incident light 15 (FIG. 3) into colours. A diffractive scatterer is shaped into the image element patterns 6. The half-tone image 2 is visible at the rotational angles δ=90° and 270° in brightness stages of a colour with inverted contrast and outside those rotational angles in grey scales with the contrast of the image original.

In a further embodiment the background fields 5 as the first structure 18 have the asymmetrical diffraction grating with the azimuth θ=0°, the grooves of which are oriented in parallel relationship with the co-ordinate axis y. The image element patterns 6 are occupied by the same asymmetrical diffraction grating but the grating vector k of the second structure 19 (FIG. 3) is oriented in opposite relationship to the grating vector k of the first structure 18, that is to say the value of the azimuth θ=180°. The half-tone image 2 is visible only at the rotational angles δ=0° and 180° in a colour which is dependent on the spatial frequency f and the observation condition, or in the case of achromatic asymmetrical diffraction gratings in the colour of the incident light 15 (FIG. 3), wherein after a rotation of 180° the contrast of the half-tone image 2 respectively reverses. Outside those two rotational angles the contrast in the half-tone image 2 disappears.

Table 2 sets out the combinations of diffractive structures for the background fields 5 and the image element patterns 6, involving contrast reversal or contrast loss with colour effects at predetermined rotational angle values δ.

Figure 9:
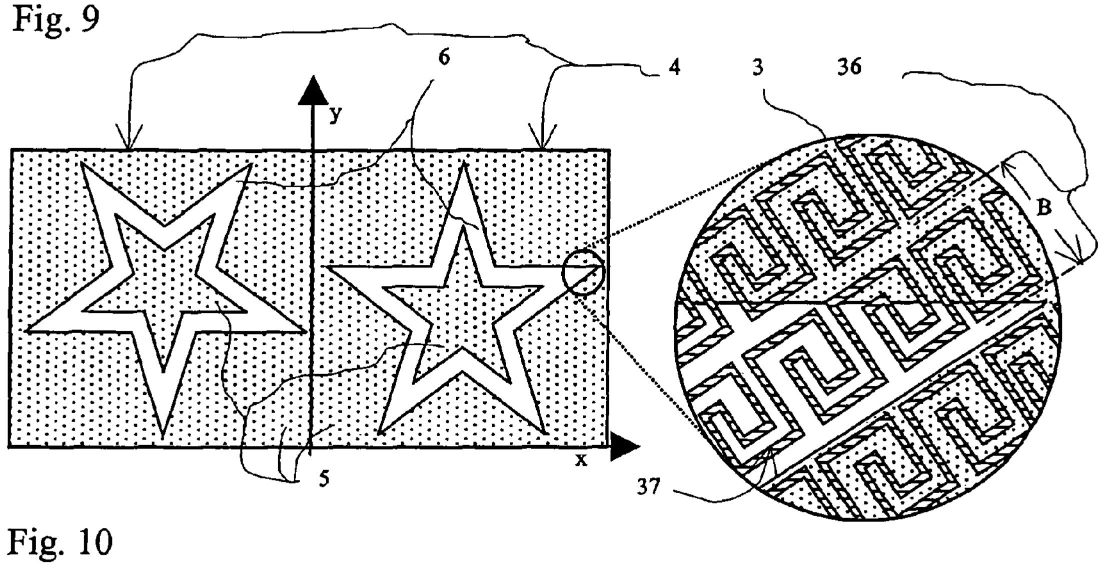
FIG. 9 shows the detail structure in the image element.

FIG. 9 shows a further embodiment of the image elements 4. The image element pattern 6 is in strip form and exhibits the contour of a pattern, here in the configuration of a star. The background field 5 is divided into at least two surface portions if the strip-shaped image element pattern 6 is closed in itself. The width of the image element pattern 6 determines the surface proportion of the image element pattern 6 in the image element 4. So that the half-tone image 2 (FIG. 8) does not involve unwanted modulation of brightness due to an excessively regular arrangement of the image elements 4 and the background fields 5 respectively, the image element patterns 6 of the adjacent image elements 4 differ for example by virtue of their orientation with respect to the co-ordinate system x, y. At the observation distance the observer sees the half-tone image 2 which breaks up into the image element patterns 6 arranged in the image elements 4, only at the reading distance.

In a further embodiment of the security element 1, as shown in the enlarged portion 3 in FIG. 9, arranged in the surface of the half-tone image 2 are pattern strips 36 which extend at least over a part of the surface of the half-tone image 2. The pattern strips 36 are of a width B in the range of 15 μm to 300 μm. For the sake of simplicity FIG. 9 shows the pattern strips 36 in mutually parallel relationship and they include a line pattern comprising a surface strip 40 (FIG. 10), for example a Grecian frieze, as can be seen from the portion 3. In another embodiment the line pattern in the pattern strips 36 is in the form of nanotext whose letters are of a letter height which is less than the width B of the pattern strips 36. Other embodiments of the line pattern include simple straight or meandering lines, sequences of pictograms and so forth. An arrangement of simple, straight or curved line elements also form the line pattern alone or in combination with the frieze and/or the nanotext and/or the pictogram. The surfaces of the line patterns are occupied by a diffractive pattern structure 37 and are of a line width of 5 μm to 50 μm. The line pattern only partially covers the background fields 5 and/or the image element patterns 6 within the surface of the pattern strip 36 so that the half-tone image 2 (FIG. 1) produced by the first and second structures 18 (FIG. 3), 19 (FIG. 3) is not markedly disturbed. The pattern structure 37 differs both from the first and also the second structures 18, 19 in at least one structural parameter. Preferably the diffraction gratings which break down the incident light 15 (FIG. 3) into colours and which involve the spatial frequencies f of 800 lines/mm to 2000 lines/mm are suitable for the microstructures 37. If the first and/or the second structures 18, 19 are not occupied by a diffractive scatterer, the diffractive scatterer is also suitable for the pattern structure 37. In an embodiment of the pattern strips 36 at least the structural parameters spatial frequency f and/or the azimuthal orientation of the grating vector of the pattern structures 37 are selected in dependence on location, that is to say the specified structural parameters are functions of the co-ordinates (x, y).

Figure 10:
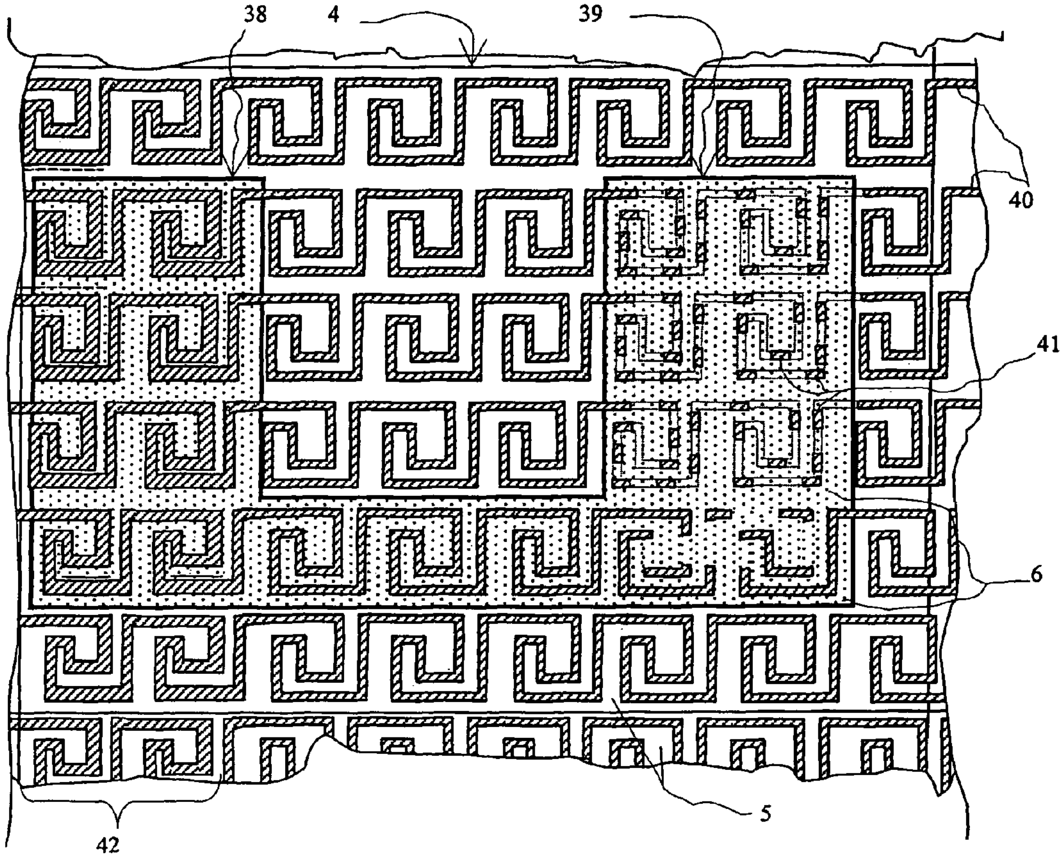
FIG. 10 shows brightness control with pattern strips.

FIG. 10 shows the image element 4 with the pattern strips 36 in detail. The pattern strips 36 extend over the background field 5 and the image element pattern 6. By way of example, for the sake of simplicity, the image element pattern 6 is of the illustrated U-shape with the limbs 38, 39 connected by a connecting portion. The surface brightness is controlled within the image element pattern 6 by means of the surface proportion of the line pattern in the pattern strip 36. The surface brightness changes within the image element pattern 6, as shown in FIG. 10, by means of an increase in the width of surface strips 40 of the line pattern in the pattern strip 36. The surface brightness of the image element pattern 6 in the left-hand limb 38 is reduced in comparison with that of the connecting portion by virtue of an increase in the width of the surface strips 40. For an increase in the brightness of the image element pattern 6 in relation to that of the connecting portion, for example in the right-hand limb 39, the width of the surface strips 40 is reduced. As, in order to be effective, the diffraction grating must include at least 3 to 5 grooves in the surface strips 40, the line width of the surface strips 40 may not be less than a minimum value which is dependent on the spatial frequency f and the direction of the grating vector k (FIG. 1). A further increase in the brightness of the image element pattern 6 causes the surface strips 40 to be broken down into small spots 41 so that the larger area contributes to the increased brightness of the image element pattern 6. The same applies in regard to modulation of the background fields 5, for example in a line region 42.

In the embodiment of the image elements 4 shown in FIG. 9 for example the line width of the surface strips 40 in the background fields 5 is the same over the entire surface of the half-tone image 2 while the surface brightness of the image element patterns 6 is controlled in accordance with the image original for the half-tone image 2 by means of the line width of the surface strips 40 in the pattern strips 36. As the small dimensions of the surface strips 40 (FIG. 10) and the spots 41 (FIG. 10) are not resolved by the eye of the observer without aids, for example a magnifying glass, microscope and so forth, the surface brightness of the image element pattern 6 is proportional to the remaining surface with the second structure 19 (FIG. 3).

If the pattern strips 36 contain the letters of a nanotext, control of the surface brightness, as described with reference to FIG. 2, is to be achieved for example by increasing or reducing the thickness of the letters or by increasing the letter spacing.

Independently of the configuration in FIG. 10 the eye of the observer, even at a normal reading distance of less than 30 cm and under suitable observation conditions, recognises the pattern strips 36 as simple light lines as the pattern in the pattern strips 36 is to be resolved only by means of the magnifying glass or microscope. Upon tilting and/or rotation the pattern strips 36, from the point of view of the observer, change their colour and/or light up or extinguish again. With a suitable choice in respect of the structural parameters for the pattern structures 37 (FIG. 9) the half-tone image 2 (FIG. 1) which is illuminated with daylight and which is arranged at the specified viewing distance has coloured strips 43 (FIG. 1) in the colour of the rainbow, which are produced by a plurality of the pattern strips 36 upon tilting or rotation, the strips 43 changing in colour and/or appearing to move over the surface of the security element 1.

In an embodiment the half-tone image 2 is part of a mosaic comprising surface elements 44 which are occupied by diffraction gratings which are independent of the half-tone image 2, the surface elements 44 deploying an optical effect in accordance with above-mentioned EP-A 0 105 099. In particular in an embodiment the pattern strips 36 are parts of the mosaic comprising the surface elements 44 which extend over the half-tone image 2.

Table 3 summarises preferred combinations of the structures 18 (FIG. 3), 19 (FIG. 3) and 37 for the background fields 5, the image element patterns 6 and the pattern strips 36.

The features of the various embodiments described herein can be combined together. In particular in the description the designations 'background fields 5' and 'image element patterns 6' or 'first structure 18' and 'second structure 19' are interchangeable.

Tables

TABLE 1

| | First structure 18 for the background field 5 | Second structure 19 for the image element pattern 6 |
|---|---|---|
| 1.1 | Flat mirror or cross grating with spatial frequencies f >2300 lines/mm or motheye structure | Diffractive scatterer |
| 1.2 | Motheye structure | Isotropic matt structure |
| 1.3 | Motheye structure | Asymmetrically achromatic diffraction grating |
| 1.4 | Superimposed diffraction grating | Anisotropic matt structure |

TABLE 2

| | First structure 18 for the background field 5 | Second structure 19 for the image element pattern 6 |
|---|---|---|
| 2.1 | Linear diffraction grating with azimuth $\theta = 0°$ | Diffractive scatterer |
| 2.2 | Linear diffraction grating with $\theta = 0°$ and the first spatial frequency $f_1$ | Linear diffraction grating with $\theta = 0°$ and the second spatial frequency $f_2$ |
| 2.3 | Linear or meandering diffraction grating with azimuth $\theta_1°$ and the first spatial frequency $f_1$ | Linear or meandering diffraction grating with azimuth $\theta_2°$ and the second spatial frequency $f_2$ |
| 2.4 | Linear or meandering diffraction grating with azimuth $\theta_1° = 90°$ and the first spatial frequency $f_1$ | Linear or meandering diffraction grating with azimuth $\theta_1° = 0°$ and the first spatial frequency $f_1$ or anisotropic matt structure |
| 2.5 | Asymmetrical diffraction grating with the azimuth $\theta_1° = 180°$ | Asymmetrical diffraction grating with the azimuth $\theta_2° = 0°$ |

TABLE 3

| | First structure 18 for the background field 5 | Second structure 19 for the image element pattern 6 | Pattern structure 37 for the pattern strip 36 |
|---|---|---|---|
| 3.1 | Mirror or cross grating with spatial frequency f of more than 2300 lines/mm | Diffraction scatterer | Linear diffraction grating with location-dependent azimuth $\theta$ |
| 3.2 | Linear diffraction grating with location-dependent functions for azimuth and spatial frequency $f_1$ | Linear diffraction grating with azimuth $\theta = 0°$ and spatial frequency $f_2$ | Diffractive scatterer |
| 3.3 | Linear or meandering diffraction grating with location-dependent azimuth and the first spatial frequency $f_1$ | Linear or meandering diffraction grating with azimuth $\theta°$ and the second spatial frequency $f_2$ | Diffractive scatterer |
| 3.4 | Linear or meandering diffraction grating or anisotropic matt structure with azimuth $\theta_1° = 0°$ | Linear or meandering diffraction grating or anisotropic matt structure with azimuth $\theta_1° \neq 0°$ | Linear diffraction grating with location-dependent spatial frequency |

What is claimed is:

1. A diffractive security element with a half-tone image comprising surface portions occupied with microscopically fine surface structures enclosed in a layer composite which includes at least a transparent embossing layer, a protective lacquer layer and a reflection layer with the microscopically fine surface structures, which is embedded between the embossing layer and the protective lacquer layer, wherein the surface portions with the first microscopically fine surface structures form background fields and surface portions with a second microscopically fine surface structure which differs from the first microscopically fine surface structures in at least one structural parameter form image element patterns and the surface of the half-tone image is divided into a plurality of image elements which are composed of the surface portions of the image element pattern and the background field and which are smaller than 1 mm at least in one dimension, wherein the image element patterns in the image elements are of the same size, pattern strips extend with a line pattern of a width of 15 μm to 300 μm at least over a part of the surface of the half-tone image and partially cover the background fields and image element patterns, the line pattern is formed from surface strips with pattern structures and with line widths in the range of 5 μm to 50 μm, wherein the line patterns include letters, texts, line elements and pictograms and the pattern structures differ from the first and second microscopically fine surface structures in at least one structural parameter, the line width of the surface strips in the background fields is constant and the surface brightness of the image elements is controlled by means of the line width of the surface strips on the image element pattern in such a way that the surface proportion of the image element pattern not covered by the line pattern is determined in accordance with the surface brightness of the image original of the half-tone image at the location of the image element and having regard to the surface brightness of the adjacent image elements, wherein the spatial frequency of linear diffraction gratings in the pattern structures is selected from the range of 800 lines/mm to 2000 lines/mm.

2. A diffractive security element according to claim 1, wherein the first and second microscopically fine surface structures are linear diffraction gratings with spatial frequencies from the range of 150 lines/mm to 2000 lines/mm.

3. A diffractive security element according to claim 1, wherein the microscopically fine surface structures are linear diffraction gratings with grating vectors and in the image element patterns the grating vectors of the second microscopically fine surface structures are parallel, wherein the grating vector of the image element patterns differs in azimuth from the grating vectors of the first microscopically fine surface structures in the background fields.

4. A diffractive security element according to claim 3, wherein the image elements whose first microscopically fine surface structures have in the background fields the same azimuth of the grating vectors are arranged in accordance with their azimuth of the grating vector in rows on the half-tone image.

5. A diffractive security element according to claim 4, wherein on its surface the adjacent rows which differ in the azimuth of the grating vectors are arranged in cyclically repetitive manner in the sequence ABC, ABC.

6. A diffractive security element according to claim 1, wherein the first microscopically fine surface structures and the second microscopically fine surface structure are meandering diffraction gratings whose spatial frequencies are selected from the range of 150 lines/mm to 2000 lines/mm, and that the meandering diffraction gratings of the background fields and the image element patterns differ at least in the azimuth range of the grating vectors.

7. A diffractive security element according to claim 1, wherein the first microscopically fine surface structures and the second microscopically fine surface structures are asymmetrical diffraction gratings, wherein the grating vectors of the asymmetrical diffraction gratings of the first microscopically fine surface structures are oriented in opposite relationship to the grating vectors of the second microscopically fine surface structures.

8. A diffractive security element according to claim 1, wherein the second microscopically fine surface structure in the surfaces of the image element patterns is a diffractive scatterer selected from the group of isotropic and anisotropic matt structures, kinoforms, diffraction gratings with circular grooves at a groove spacing of 1 to 3 μm and the matt structures superimposed with a diffraction grating.

9. A diffractive security element according to claim 8, wherein the background fields as the first microscopically fine surface structure have a structure from the group which includes flat mirrors, cross gratings with spatial frequencies of greater than 2300 lines/mm and motheye structures.

10. A diffractive security element according to claim 8, wherein the background fields as the first microscopically fine surface structure have a linear diffraction grating with a spatial frequency from the range of 150 lines/mm to 2000 lines/mm and grating vectors which are oriented in mutually parallel relationship.

11. A diffractive security element according to claim 1, wherein the first microscopically fine surface structures and the second microscopically fine surface structure are linear or meandering diffraction gratings which differ in spatial frequency.

12. A diffractive security element according to claim 1, wherein the spatial frequency of the linear diffraction gratings in the pattern structures is dependent on the location on the halftone image.

13. A diffractive security element according to claim 1, wherein the azimuthal orientation of the grating vector of the linear diffraction grating in the pattern structures is dependent on the location on the halftone image.

14. A diffractive security element according to claim 1, wherein the half-tone image is part of a mosaic of surface portions occupied by microscopically fine surface structures which are independent of the half-tone image.

15. A diffractive security element according to claim 1, wherein the layer composite is adapted to be fixed by adhesive on a substrate.

16. A diffractive security element with a half-tone image comprising surface portions occupied with microscopically fine surface structures enclosed in a layer composite which includes at least a transparent embossing layer, a protective lacquer layer and a reflection layer with the microscopically fine surface structures, which is embedded between the embossing layer and the protective lacquer layer, wherein the surface portions with the first microscopically fine surface structures form background fields and surface portions with a second microscopically fine surface structure which differs from the first microscopically fine surface structures in at least one structural parameter form image element patterns and the surface of the halftone image is divided into a plurality of image elements which are composed of the surface portions of the image element pattern and the background field and which are smaller than 1 mm at least in one dimension, wherein the image element patterns in the image elements are of the same size, pattern strips extend with a line pattern of a width of 15 μm to 300 μm at least over a part of the surface of the half-tone image and partially cover the background fields and image element patterns, the line pattern is formed from surface strips with pattern structures and with line widths in the range of 5 μm to 50 μm, wherein the line patterns include letters, texts, line elements and pictograms and the pattern structures differ from the first and second microscopically fine surface structures in at least one structural parameter, the line width of the surface strips in the background fields is constant and the surface brightness of the image elements is controlled by means of the line width of the surface strips on the image element pattern in such a way that the surface proportion of the image element pattern not covered by the line pattern is determined in accordance with the surface brightness of the image original of the halftone image at the location of the image element and having regard to the surface brightness of the adjacent image elements, wherein the first and second microscopically fine surface structures are linear diffraction gratings with spatial frequencies from the range of 150 lines/mm to 2000 lines/mm.

17. A diffractive security element according to claim 16, wherein the microscopically fine surface structures are linear diffraction gratings with grating vectors and in the image element patterns the grating vectors of the second microscopically fine surface structures are parallel, wherein the grating vector of the image element patterns differs in azimuth from the grating vectors of the first microscopically fine surface structures in the background fields.

18. A diffractive security element according to claim 17, wherein the image elements whose first microscopically fine surface structures have in the background fields the same azimuth of the grating vectors are arranged in accordance with their azimuth of the grating vector in rows on the half-tone image.

19. A diffractive security element according to claim 18, wherein on its surface the adjacent rows which differ in the azimuth of the grating vectors are arranged in cyclically repetitive manner in the sequence ABC, ABC.

20. A diffractive security element according to claim 16, wherein the spatial frequency of the linear diffraction gratings in the pattern structures is selected from the range of 800 lines/mm to 2000 lines/mm, wherein the spatial frequency of the linear diffraction gratings in the pattern structures is dependent on the location on the half-tone image.

21. A diffractive security element according to claim 16, wherein the spatial frequency of the linear diffraction gratings in the pattern structures is selected from the range of 800 lines/mm to 2000 lines/mm, wherein the azimuthal orientation of the grating vector of the linear diffraction grating in the pattern structures is dependent on the location on the halftone image.

22. A diffractive security element according to claim 16, wherein the first microscopically fine surface structures and the second microscopically fine surface structures are asymmetrical diffraction gratings, wherein the grating vectors of the asymmetrical diffraction gratings of the first microscopically fine surface structures are oriented in opposite relationship to the grating vectors of the second microscopically fine surface structures.

23. A diffractive security element according to claim 16, wherein the spatial frequency of the linear diffraction gratings in the pattern structures is selected from the range of 800 lines/mm to 2000 lines/mm.

24. A diffractive security element according to claims 16, wherein the spatial frequency of the linear diffraction gratings in the pattern structures is dependent on the location on the half-tone image.

25. A diffractive security element according to claim 16, wherein the azimuthal orientation of the grating vector of the linear diffraction grating in the pattern structures is dependent on the location on the half-tone image.

26. A diffractive security element according to claim 16, wherein the pattern structure is one of the diffractive scatterers selected from the group of isotropic and anisotropic matt structures, kinoforms, diffraction gratings with circular grooves at a groove spacing of 1 to 3 μm and the matt structures superimposed with a diffraction grating.

27. A diffractive security element according to claim 16, wherein the half-tone image is part of a mosaic of surface portions occupied by microscopically fine surface structures which are independent of the half-tone image.

28. A diffractive security element according to claim 16, wherein the layer composite is adapted to be fixed by adhesive on a substrate.

29. A diffractive security element with a half-tone image comprising surface portions occupied with microscopically fine surface structures enclosed in a layer composite which includes at least a transparent embossing layer, a protective lacquer layer and a reflection layer with the microscopically fine surface structures, which is embedded between the embossing layer and the protective lacquer layer, wherein the surface portions with the first microscopically fine surface structures form background fields and surface portions with a second microscopically fine surface structure which differs from the first microscopically fine surface structures in at least one structural parameter form image element patterns and the surface of the halftone image is divided into a plurality of image elements which are composed of the surface portions of the image element pattern and the background field and which are smaller than 16 mm at least in one dimension, wherein the image element patterns in the image elements are of the same size, pattern strips extend with a line pattern of a width of 15 μm to 300 μm at least over a part of the surface of the half-tone image and partially cover the background fields and image element patterns, the line pattern is formed from surface strips with pattern structures and with line widths in the range of 5 μm to 50 μm, wherein the line patterns include letters, texts, line elements and pictograms and the pattern structures differ from the first and second microscopically fine surface structures in at least one structural parameter, the line width of the surface strips in the background fields is constant and the surface brightness of the image elements is controlled by means of the line width of the surface strips on the image element pattern in such a way that the surface proportion of the image element pattern not covered by the line pattern is determined in accordance with the surface brightness of the image original of the half-tone image at the location of the image element and having regard to the surface brightness of the adjacent image elements, wherein the first microscopically fine surface structures and the second microscopically fine surface structure are meandering diffraction gratings whose spatial frequencies are selected from the range of 150 lines/mm to 2000 lines/mm, the meandering diffraction gratings of second microscopically fine surface structure including grating vectors having a range in the azimuth, and the meandering diffraction gratings of the background fields and the image element patterns differ at least in the azimuth range of the grating vectors.

30. A diffractive security element according to claim 29, wherein the image elements whose first microscopically fine surface structures have in the background fields the same range in the azimuth of the grating vectors are arranged in accordance with their range in the azimuth of the grating vector in rows on the half-tone image.

31. A diffractive security element according to claim 30, wherein on its surface the adjacent rows which differ in the range in the azimuth of the grating vectors are arranged in cyclically repetitive manner in the sequence ABC, ABC.

32. A diffractive security element according to claim 29, wherein the spatial frequency of the linear diffraction gratings in the pattern structures is selected from the range of 800 lines/mm to 2000 lines/mm.

33. A diffractive security element according to claims 29, wherein the spatial frequency of the linear diffraction gratings in the pattern structures is dependent on the location on the half-tone image.

34. A diffractive security element according to claim 29, wherein the azimuthal orientation of the grating vector of the linear diffraction grating in the pattern structures is dependent on the location on the half-tone image.

35. A diffractive security element according to claim 29, wherein the pattern structure is one of the diffractive scatterers selected from the group of isotropic and anisotropic matt structures, kinoforms, diffraction gratings with circular grooves at a groove spacing of 1 to 3 μm and the matt structures superimposed with a diffraction grating.

36. A diffractive security element according to claim 29, wherein the half-tone image is part of a mosaic of surface portions occupied by microscopically fine surface structures which are independent of the half-tone image.

37. A diffractive security element according to claim 29, wherein the layer composite is adapted to be fixed by adhesive on a substrate.

38. A diffractive security element according to claim 29, wherein the first microscopically fine surface structures and the second microscopically fine surface structures are asymmetrical diffraction gratings, wherein the grating vectors of the asymmetrical diffraction gratings of the first microscopically fine surface structures are oriented in opposite relationship to the grating vectors of the second microscopically fine surface structures.

39. A diffractive security element with a half-tone image comprising surface portions occupied with microscopically fine surface structures enclosed in a layer composite which includes at least a transparent embossing layer, a protective lacquer layer and a reflection layer with the microscopically fine surface structures, which is embedded between the embossing layer and the protective lacquer layer, wherein the surface portions with the first microscopically fine surface structures form background fields and surface portions with a second microscopically fine surface structure which differs from the first microscopically fine surface structures in at least one structural parameter form image element patterns and the surface of the half-tone image is divided into a plurality of image elements which are composed of the surface portions of the image element pattern and the background field and which are smaller than 1 mm at least in one dimension, wherein the image element patterns in the image elements are of the same size, pattern strips extend with a line pattern of a width of 15 μm to 300 μm at least over a part of the surface of the half-tone image and partially cover the background fields and image element patterns, the line pattern is formed from surface strips with pattern structures and with line widths in the range of 5 μm to 50 μm, wherein the line patterns include letters, texts, line elements and pictograms and the pattern structures differ from the first and second microscopically fine surface structures in at least one structural parameter, the line width of the surface strips in the background fields is constant and the surface brightness of the image elements is controlled by means of the line width of the surface strips on the image element pattern in such a way that the surface proportion of the image element pattern not covered by the line pattern is determined in accordance with the surface brightness of the image original of the half-tone image at the location of the image element and having regard to the surface brightness of the adjacent image elements, wherein the background fields as the first microscopically fine surface structure have a structure from the group which includes flat mirrors, cross gratings with spatial frequencies of greater than 2300 lines/mm and motheye structures.

40. A diffractive security element according to claim 39, wherein the second microscopically fine surface structure in the surfaces of the image element patterns is a diffractive scatterer selected from the group of isotropic and anisotropic matt structures, kinoforms, diffraction gratings with circular grooves at a groove spacing of 1 to 3 μm and the matt structures superimposed with a diffraction grating.

41. A diffractive security element according to claim 39, wherein the spatial frequency of the linear diffraction gratings in the pattern structures is selected from the range of 800 lines/mm to 2000 lines/mm.

42. A diffractive security element according to claims 39, wherein the spatial frequency of the linear diffraction gratings in the pattern structures is dependent on the location on the half-tone image.

43. A diffractive security element according to claim 39, wherein the azimuthal orientation of the grating vector of the linear diffraction grating in the pattern structures is dependent on the location on the half-tone image.

44. A diffractive security element according to claim 39, wherein the pattern structure is one of the diffractive scatterers selected from the group of isotropic and anisotropic matt structures, kinoforms, diffraction gratings with circular grooves at a groove spacing of 1 to 3 μm and the matt structures superimposed with a diffraction grating.

45. A diffractive security element according to claim 39, wherein the half-tone image is part of a mosaic of surface portions occupied by microscopically fine surface structures which are independent of the half-tone image.

46. A diffractive security element according to claim 39, wherein the layer composite is adapted to be fixed by adhesive on a substrate.

47. A diffractive security element with a half-tone image comprising surface portions occupied with microscopically fine surface structures enclosed in a layer composite which includes at least a transparent embossing layer, a protective lacquer layer and a reflection layer with the microscopically fine surface structures, which is embedded between the embossing layer and the protective lacquer layer, wherein the surface portions with the first microscopically fine surface structures form background fields and surface portions with a second microscopically fine surface structure which differs from the first microscopically fine surface structures in at least one structural parameter form image element patterns and the surface of the half-tone image is divided into a plurality of image elements which are composed of the surface portions of the image element pattern and the background field and which are smaller than 1 mm at least in one dimension, wherein the image element patterns in the image elements are of the same size, pattern strips extend with a line pattern of a width of 15 μm to 300 μm at least over a part of the surface of the half-tone image and partially cover the background fields and image element patterns, the line pattern is formed from surface strips with pattern structures and with line widths in the range of 5 μm to 50 μm, wherein the line patterns include letters, texts, line elements and pictograms and the pattern structures differ from the first and second microscopically fine surface structures in at least one structural parameter, the line width of the surface strips in the background fields is constant and the surface brightness of the image elements is controlled by means of the line width of the surface strips on the image element pattern in such a way that the surface proportion of the image element pattern not covered by the line pattern is determined in accordance with the surface brightness of the image original of the half-tone image at the location of the image element and having regard to the surface brightness of the adjacent image elements, wherein the background fields as the first microscopically fine surface structure have a linear diffraction grating with a spatial frequency from the range of 150 lines/mm to 2000 lines/mm and grating vectors which are oriented in mutually parallel relationship.

48. A diffractive security element according to claim 47, wherein the second microscopically fine surface structure in the surfaces of the image element patterns is a diffractive scatterer selected from the group of isotropic and anisotropic matt structures, kinoforms, diffraction gratings with circular grooves at a groove spacing of 1 to 3 μm and the matt structures superimposed with a diffraction grating.

49. A diffractive security element according to claim 47, wherein the spatial frequency of the linear diffraction gratings in the pattern structures is selected from the range of 800 lines/mm to 2000 lines/mm.

50. A diffractive security element according to claims 47, wherein the spatial frequency of the linear diffraction gratings in the pattern structures is dependent on the location on the half-tone image.

51. A diffractive security element according to claim 47, wherein the azimuthal orientation of the grating vector of the linear diffraction grating in the pattern structures is dependent on the location on the half-tone image.

52. A diffractive security element according to claim 47, wherein the pattern structure is one of the diffractive scatterers selected from the group of isotropic and anisotropic matt structures, kinoforms, diffraction gratings with circular grooves at a groove spacing of 1 to 3 μm and the matt structures superimposed with a diffraction grating.

53. A diffractive security element according to claim 47, wherein the half-tone image is part of a mosaic of surface portions occupied by microscopically fine surface structures which are independent of the half-tone image.

54. A diffractive security element according to claim 47, wherein the layer composite is adapted to be fixed by adhesive on a substrate.

* * * * *

UNITED STATES PATENT AND TRADEMARK OFFICE

CERTIFICATE OF CORRECTION

PATENT NO. : 7,719,733 B2
APPLICATION NO. : 10/578108
DATED : May 18, 2010
INVENTOR(S) : Schilling et al.

It is certified that error appears in the above-identified patent and that said Letters Patent is hereby corrected as shown below:

Column 20, Line 16, Now reads: "which are smaller than 16 mm"

Should read: -- which are smaller than 1 mm --

Signed and Sealed this

Sixteenth Day of November, 2010

David J. Kappos
*Director of the United States Patent and Trademark Office*